E. R. PACKER.
FIXTURE FOR CAR VESTIBULE CURTAINS.
APPLICATION FILED APR. 5, 1912.
1,217,210.
Patented Feb. 27, 1917.
3 SHEETS—SHEET 1.
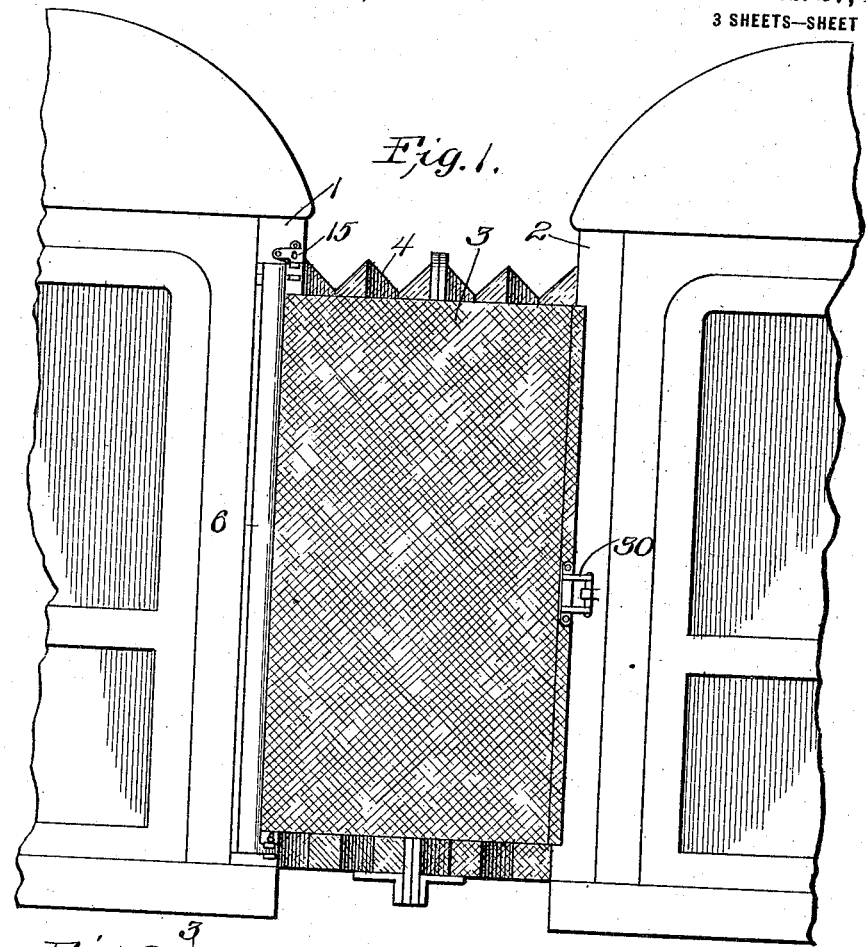
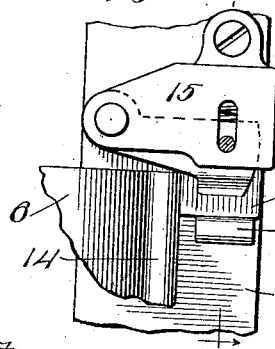
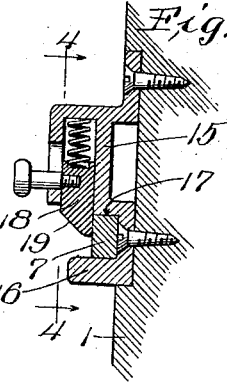
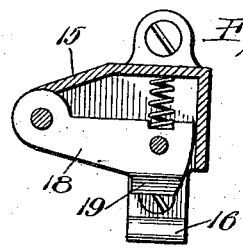
Witnesses:
Harry S. Gaither
Ruby V. Brydges
Inventor
Eben R Packer
by Chamberlin Freudenreich
Att'ys.

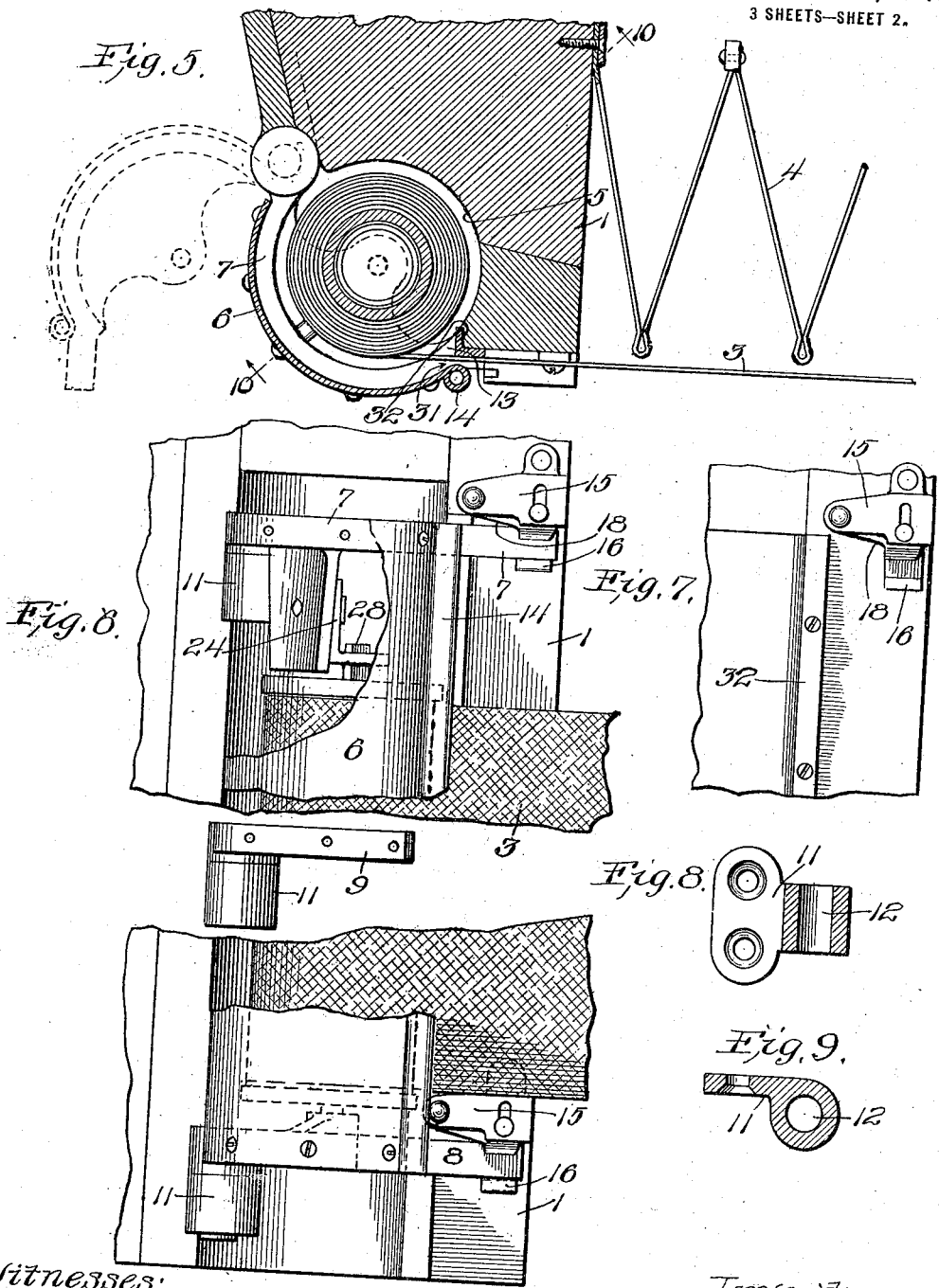

E. R. PACKER.
FIXTURE FOR CAR VESTIBULE CURTAINS.
APPLICATION FILED APR. 5, 1912.
1,217,210.
Patented Feb. 27, 1917.
3 SHEETS—SHEET 3.
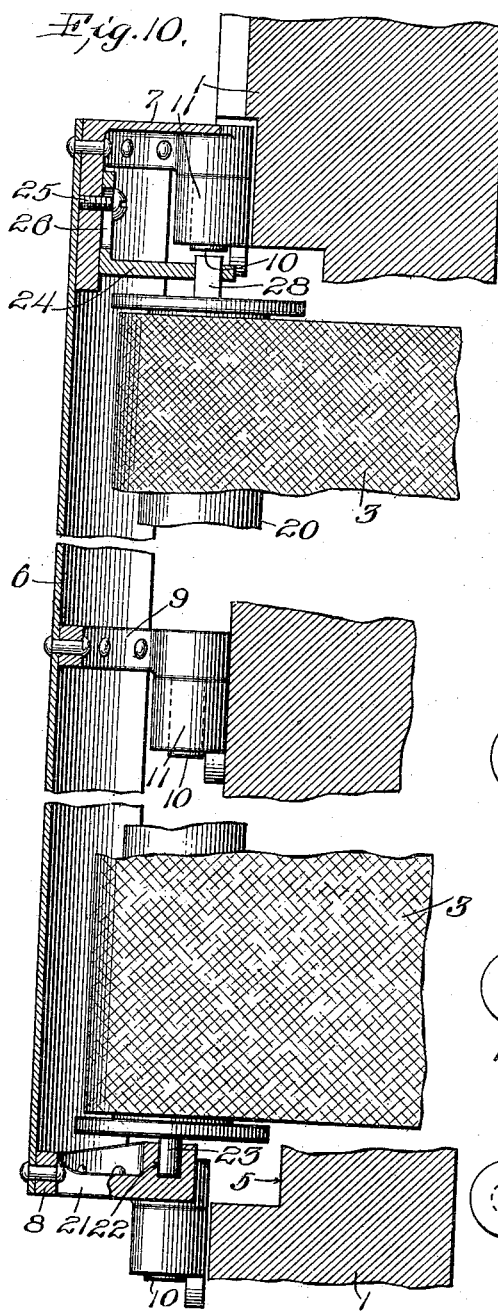
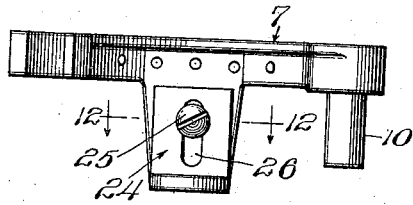
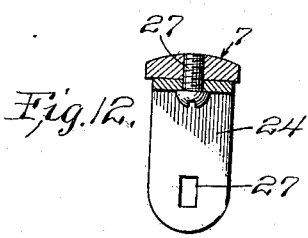
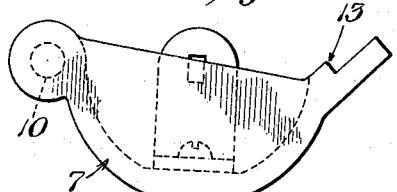
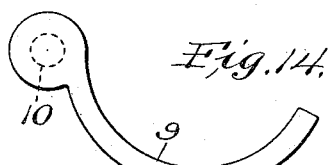
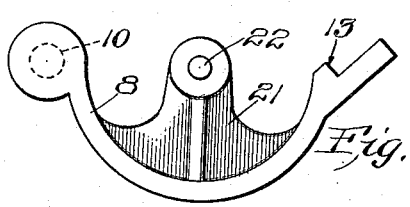
Witnesses:
Harry S. Gaither
Ruby V. Brydges
Inventor
Eben R. Packer
by Chamberlin & Freudenreich
Attys.

UNITED STATES PATENT OFFICE.

EBEN RAY PACKER, OF CHICAGO, ILLINOIS, ASSIGNOR, BY MESNE ASSIGNMENTS, TO THE Q & C COMPANY, A CORPORATION OF MAINE.

FIXTURE FOR CAR-VESTIBULE CURTAINS.

1,217,210.

Specification of Letters Patent. Patented Feb. 27, 1917.

Application filed April 5, 1912. Serial No. 688,653.

*To all whom it may concern:*

Be it known that I, EBEN R. PACKER, a citizen of the United States, residing at Chicago, county of Cook, State of Illinois, have invented a certain new and useful Improvement in Fixtures for Car-Vestibule Curtains, and declare the following to be a full, clear, and exact description of the same, such as will enable others skilled in the art to which it pertains to make and use the same, reference being had to the accompanying drawings, which form a part of this specification.

My invention has for its object to produce a neat, simple and compact arrangement for mounting curtains adapted to cover the diaphragms at the sides of the passageway leading from the vestibules of one car to another.

A further object of my invention is to produce a fixture of the kind specified which will give ready access to the curtain roller and permit the same to be removed and replaced quickly and conveniently.

A further object of my invention is to produce a fixture of the kind specified which will normally house and conceal the curtain roller but which will permit the roller to be exposed for inspection and repair without completely detaching any part of the housing from the car.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a longitudinal vertical section through the adjoining vestibules of two cars, showing my improvements applied thereto;

Fig. 2 is a front view on an enlarged scale of the catch for holding the curtain housing in place;

Fig. 3 is a section on line 3—3 of Fig. 2;

Fig. 4 is a section on line 4—4 of Fig. 3;

Fig. 5 is a transverse section on an enlarged scale through one of the vestibule posts on which my fixture is mounted;

Fig. 6 is a view looking in the direction of the line 10 in Fig. 5, a portion of the post being illustrated and parts of the fixture being broken away in order more clearly to illustrate normally hidden elements;

Fig. 7 is a side view of a fragment of the upper portion of the vestibule post, the curtain fixture being removed;

Figs. 8 and 9 are respectively a vertical section and a horizontal section through one of the stationary hinge members for supporting the housing.

Fig. 10 is a section on line 10—10 of Fig. 5;

Fig. 11 is a rear or inside view of the upper bracket forming part of the housing;

Fig. 12 is a section on line 12—12 of Fig. 11; and

Figs. 13, 14 and 15 are plan views of the upper, intermediate and lower brackets, respectively.

Referring to the drawings, 1 and 2 represent the vestibule door posts on the same side of the adjacent ends of two cars. 3 is a curtain which is mounted upon one of the door posts and adapted to be drawn across the space between the two posts, thus forming a cover across the inner sides of the diaphragm 4 and protecting the passenger against contact with the diaphragm.

In accordance with my invention I form a longitudinal groove 5 in the inner corner of the door post 1 and provide a detachable rotatable housing or casing which coöperates with the groove to form a cylindrical chamber for containing the curtain. In the preferred arrangement the housing consists of a long semi-cylindrical trough 6 of sheet metal permanently secured at its upper end to the outer face of a curved arm or bracket 7 and at its lower end to a similar arm or bracket 8. For the sake of rigidity there may also be an intermediate arm or bracket 9. Each arm or bracket is provided at one end with a downwardly extending trunnion 10, the several trunnions being in axial alinement with each other. On the vestibule post, at one side of the groove are disposed three bearing members 11 having vertical alined sockets 12, they being so disposed that each will receive one of the trunnions on the housing when the housing is placed in position in front of the groove; thus supporting the housing on three hinges which will permit it to be swung from a position in which it closes the mouth of the groove as indicated in full lines in Fig. 5 to a position in which it leaves the groove uncovered as indicated in dotted lines in Fig. 5. The free ends of the members 7 and 8 extend beyond the adjacent edge of the plate 6 so as to form stops to engage with the side of the post and limit the inward movement of the housing. They are also preferably provided with inwardly projecting lugs or shoulders 13 which extend slightly into the groove when the housing is in its closed position, thus wedging the housing in place and preventing it from rattling. The edge of the plate opposite the hinge is preferably curled or rolled into a bead 14 so as to provide a rounded corner spaced apart a short distance from the side of the post so as to leave a long narrow slot through which the curtain passes. In order not to obstruct this slot, the intermediate bracket or arm terminates short of the beaded edge of the housing.

On the post beside the free edge of the housing are two supporting and locking members for engaging with and holding the projecting ends of the members 7 and 8, these members being best illustrated in Figs. 2 to 4 and 6 and 7. Each holding and locking member may conveniently consist of a plate 15 secured to the post in any suitable manner and having a shelf or ledge 16 for receiving the free end of one of the arms or brackets of the housing. Each of the members 15 is also preferably provided with a shoulder 17 projecting outwardly therefrom so as to overlie and engage with the upper edge of the arm or bracket lying upon the shelf or ledge. On the front side is a vertically movable latch or dog 18 which preferably has its lower outer corner beveled as indicated at 19. When free to do so, the dog or latch drops down far enough to engage with the outer side of a housing member lying on the shelf 16, thus locking this member and the housing against rotary movement. By beveling the dog or catch, it will be automatically lifted when the housing is swung shut and thus insure that the housing will be locked in its closed position. I have shown a locking and holding member both at the top and at the bottom of the housing, but it will of course be understood that one of these may be omitted if desired.

The curtain roller is supported by the brackets 7 and 8. The lower bracket 8, is provided with an inwardly extending arm 21 having a vertical socket for receiving a trunnion 23 on the lower end of the curtain roller. On the upper bracket 7 is an angle member 24 one arm of which is connected to the bracket by means of a screw 25 and slot 26 so as to afford vertical adjustment. The other arm of the angle is provided with a rectangular hole 27 into which projects the rectangular post 28 at the upper end of the curtain roller. In other words, the curtain roller is of the ordinary spring type which will permit the curtain to be unwound against the tension of the spring and which, when free to do so, will rewind the curtain. One end of the curtain is connected to the roller and on the other end is a suitable device 30 by which it may be attached to the door post 2 on the other car.

The parts are so proportioned that the curtain extends substantially tangentially from the roller through the slot 31 between the housing and the post 1 and to the post on the other car without producing any appreciable bend in the curtain where it engages with the post 1. To prevent chafing of the curtain when it does engage with the post 1 I have provided an angular guard or protecting piece 32 at the edge of the groove past which the curtain extends.

It will thus be seen that the entire curtain fixture with its housing is a complete unit so that the parts may be inspected by simply unlatching the housing and swinging it out. If desired, the entire fixture may be removed by simply lifting it off its hinges after it has been swung out; or, if desired, the curtain itself may be removed without removing the housing, by simply swinging the housing open and lifting the supporting angle at the upper end of the roller. Thus the curtain roller may be laid open for inspection and repair or the entire fixture may be removed without altering the adjustments of the parts; the housing being simply swung closed after an inspection of the curtain roller and being simply placed upon its hinges and swung closed after the entire fixture has been removed.

I claim:

1. In combination, a post, a housing hinged at one side to the post and forming therewith a curtain-receiving chamber, and a curtain-supporting device mounted on said housing at one side of the axis of the hinge so as to be movable with the housing into and out of said chamber.

2. In combination, a post, a housing hinged to the post and forming therewith a curtain-receiving chamber; and a curtain roller revolubly supported by the housing at one side of the axis of the hinge so as to be movable into and out of the chamber upon swinging the housing about its hinge.

3. In combination, a post, a housing hinged at one side to the post and forming therewith a curtain-receiving chamber, a curtain-supporting device mounted on said housing at one side of the axis of the hinge so as to be movable with the housing into and out of said chamber, and means for detachably locking said housing against movement relative to the post.

4. In combination, a post, a housing hinged to the post and forming therewith a curtain-receiving chamber, supports projecting from said housing into said chamber, and means on said supports at one side of the axis of said hinge for supporting a curtain roller so as to permit the roller to be swung into and out of said chamber when the housing is swung upon its hinge.

5. In combination, a post having a longitudinal groove therein, a housing hinged to the post at one side of the groove and forming therewith a curtain-receiving chamber, and curtain supports projecting from said housing into the middle of said chamber.

6. In combination, a post, a housing adapted to form therewith a curtain-receiving chamber, open-top bearings on said post at one side of said housing, trunnions on the housing resting in said bearings, a curtain supported by said housing at a point within the chamber, and means for locking said housing to the post so as to prevent movements of said trunnions in said bearings.

7. In combination, a post, a series of alined open-top bearings on the post, a curved housing adapted to form with said post a curtain-receiving chamber, alined vertical trunnions on said housing positioned and arranged to rest in said bearings, a projection on the side of the housing opposite the trunnions, and a holding member mounted on the post in position to receive and engage with said projection.

8. In combination, a post, a sheet metal housing adapted to form with the post a curtain-receiving member, brackets secured to the housing at the top and the bottom thereof, trunnions on one end of each of said brackets, open-top bearing seats on the post for receiving said trunnions, the other end of each of said brackets extending beyond the housing, and supporting members on the post for engaging the latter ends of the brackets.

9. In combination, a post, a sheet metal housing adapted to form with the post a curtain-receiving member, brackets secured to the housing at the top and the bottom thereof, trunnions on one end of each of said brackets, open-top bearing seats on the post for receiving said trunnions, the other end of each of said brackets extending beyond the housing, supporting members on the post for engaging the latter ends of the brackets, and a catch on the post for engaging with one of the extending ends of the brackets and holding the housing against angular movements about its trunnions.

10. In combination, a post having a longitudinal groove therein, a curved housing coöperating with the post to form with the groove a curtain-receiving chamber, a hinge at one side of said groove for connecting the housing to the post, locking and supporting devices for the housing on the other side of the groove, and supports for a curtain roller extending from said housing into the middle of said chamber.

In testimony whereof, I sign this specification in the presence of two witnesses.

EBEN RAY PACKER.

Witnesses:
   WM. F. FREUDENREICH,
   HARRY S. GAITHER.